Nov. 24, 1964     T. M. MORROW     3,158,523
APPARATUS FOR PRODUCING IDENTIFICATION CARDS
Filed Jan. 23, 1961     4 Sheets-Sheet 1
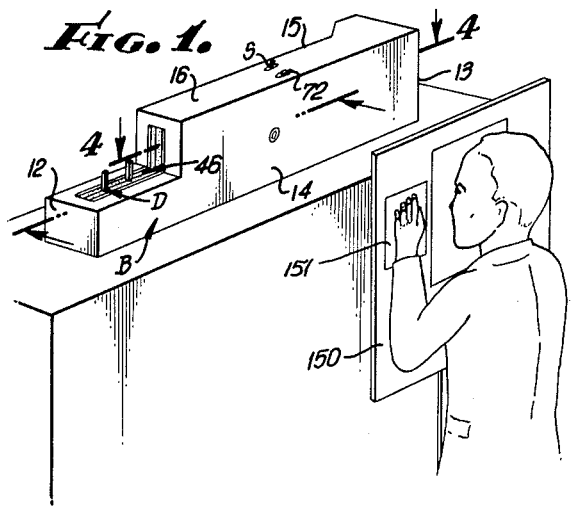
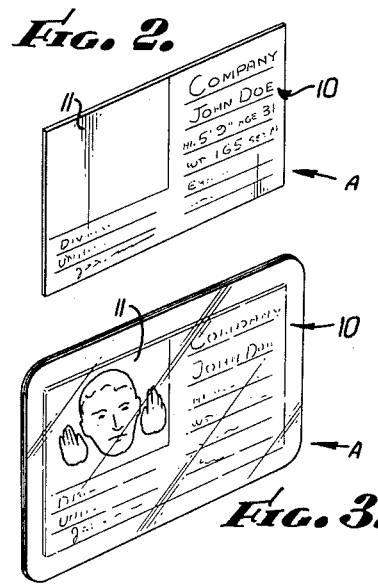
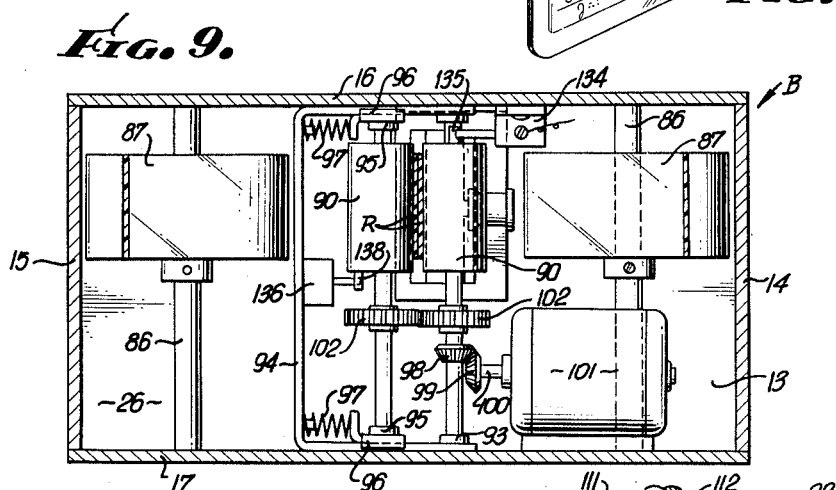
INVENTOR.
THURLOW M. MORROW
BY
AGENT.

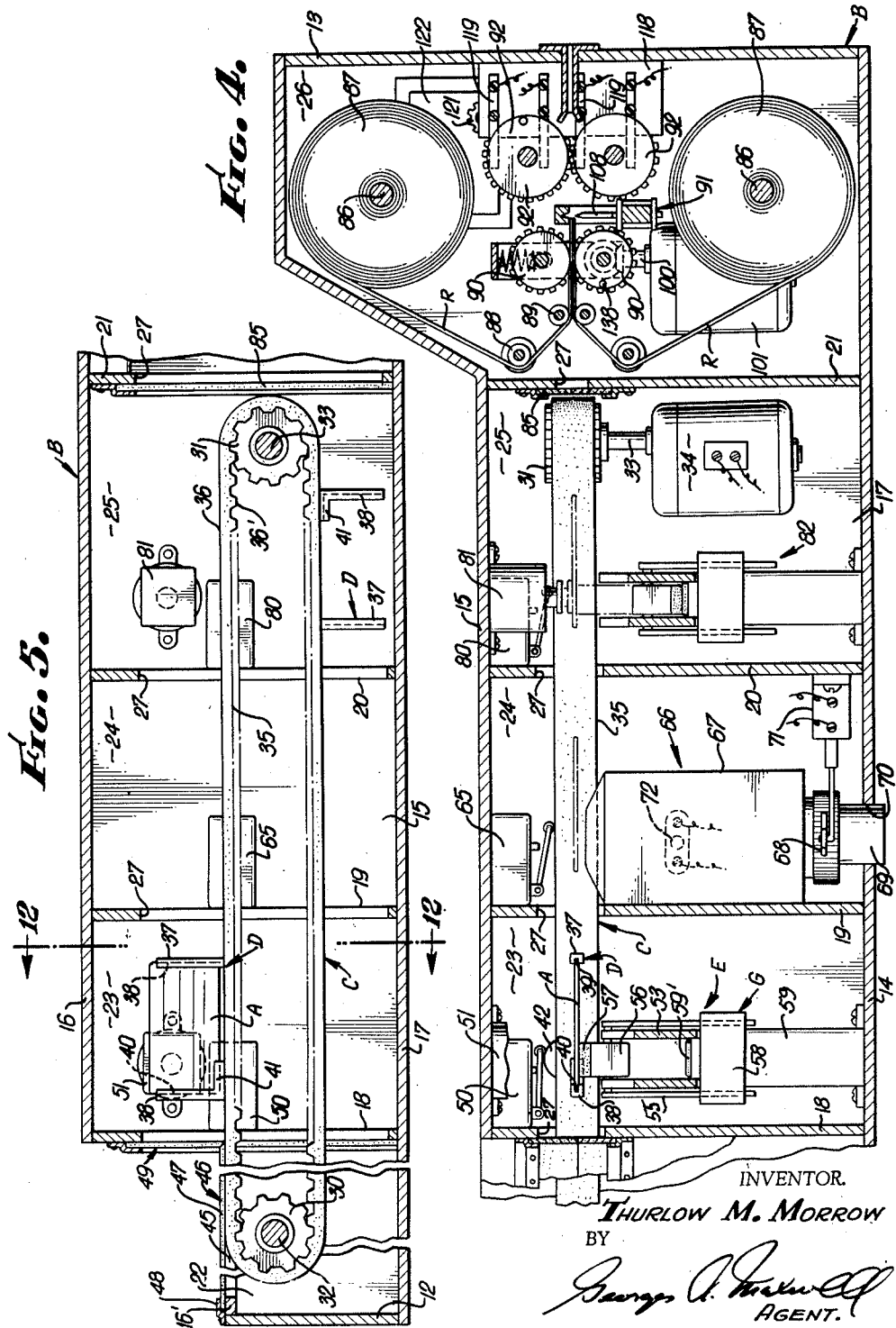

Nov. 24, 1964  T. M. MORROW  3,158,523
APPARATUS FOR PRODUCING IDENTIFICATION CARDS
Filed Jan. 23, 1961  4 Sheets-Sheet 3
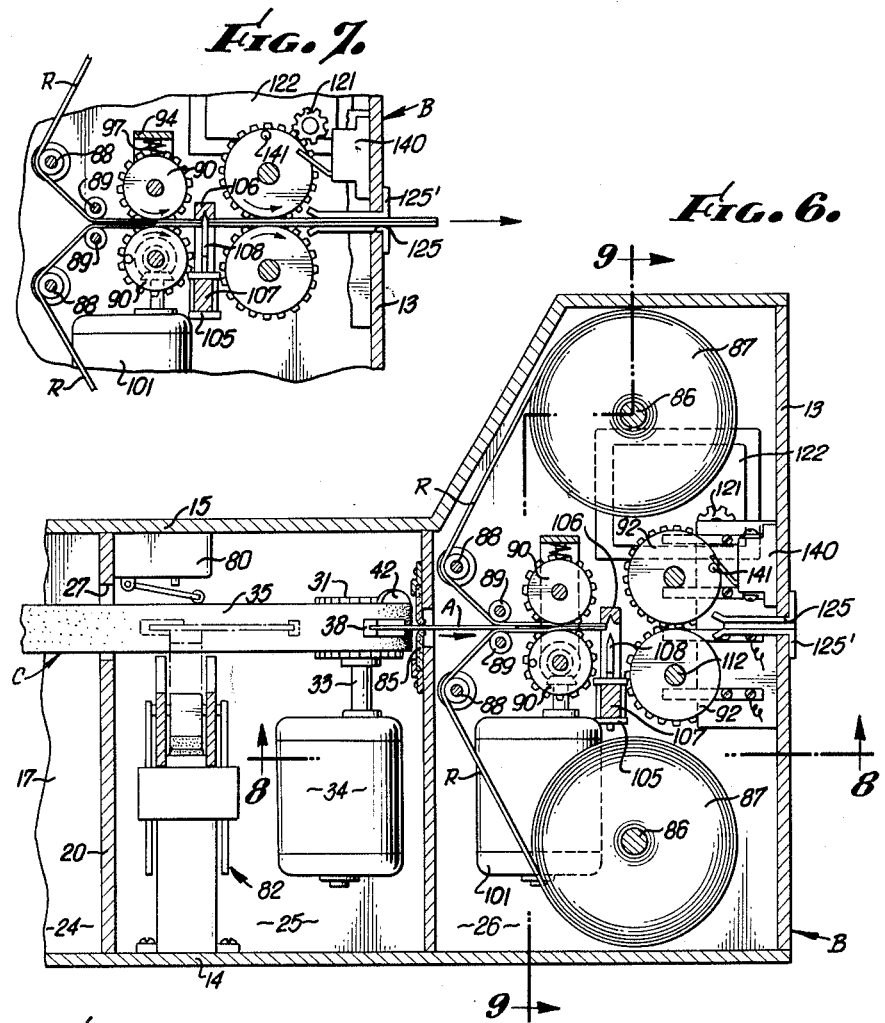
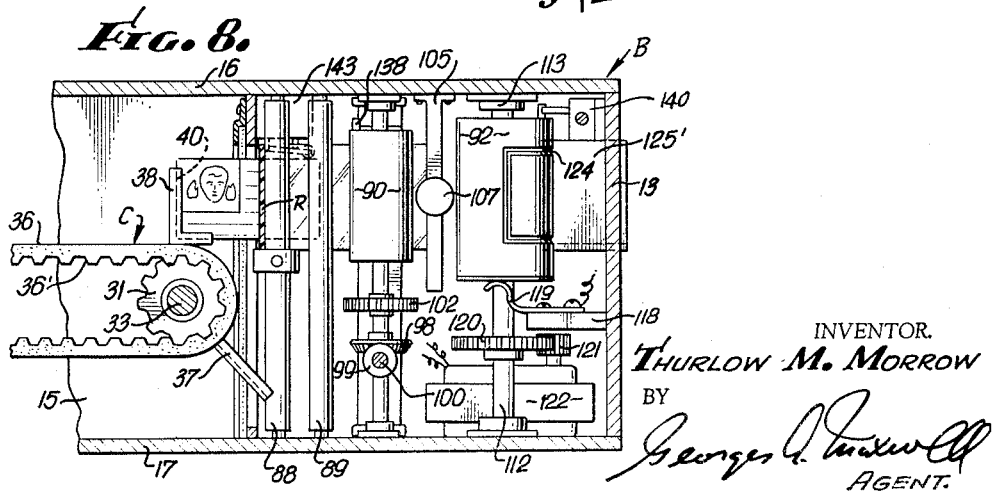
INVENTOR.
THURLOW M. MORROW
BY
AGENT.

Nov. 24, 1964   T. M. MORROW   3,158,523
APPARATUS FOR PRODUCING IDENTIFICATION CARDS
Filed Jan. 23, 1961   4 Sheets-Sheet 4
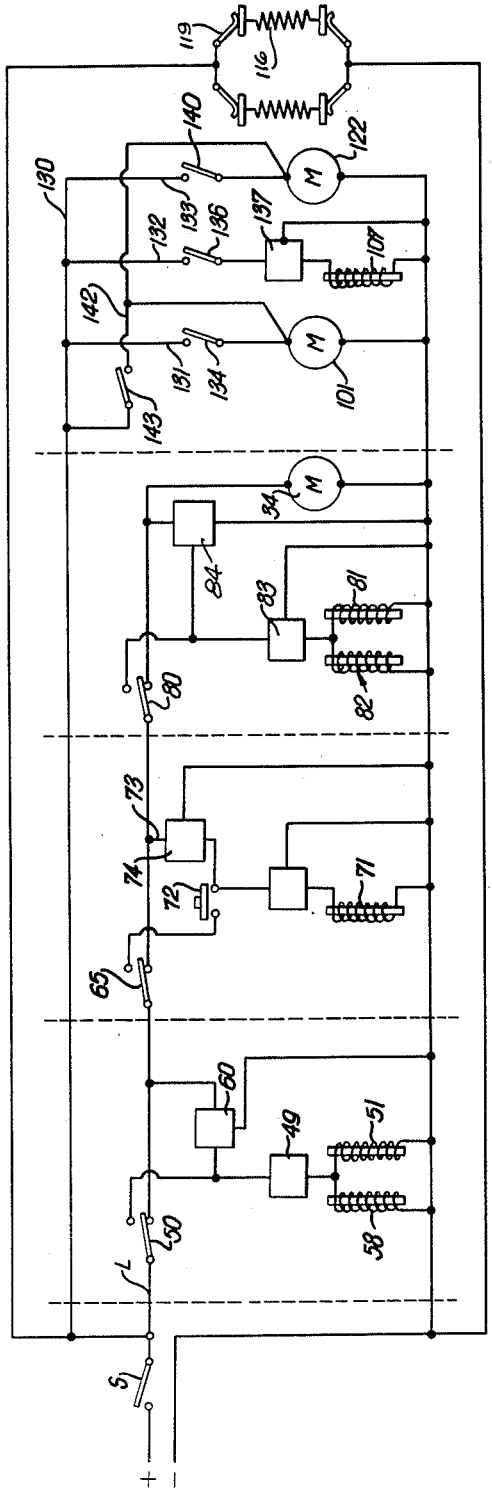
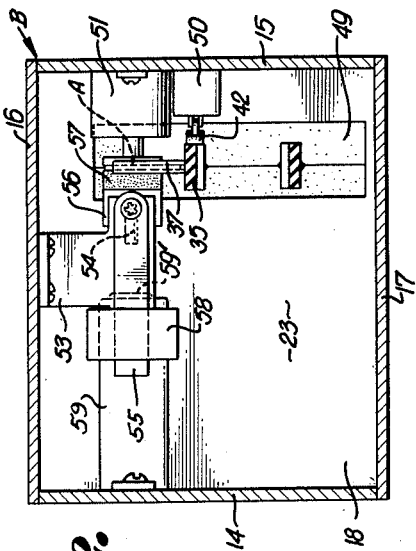
INVENTOR.
THURLOW M. MORROW
BY
AGENT.

United States Patent Office 3,158,523
Patented Nov. 24, 1964

3,158,523
APPARATUS FOR PRODUCING IDENTIFICATION CARDS
Thurlow M. Morrow, Pasadena, Calif., assignor to George Almgren, Bakersfield, Calif.
Filed Jan. 23, 1961, Ser. No. 84,426
14 Claims. (Cl. 156—522)

This invention has to do with a novel method and apparatus for producing identification cards and is more particularly concerned with a method and apparatus for producing a plastic laminated card having written, printed, and photographic information thereon, in one continuous, uninterrupted process.

The present day state of the art of producing identification cards of the character referred to involves a number of separate, manual operations, each of which is time consuming and necessitates the provision of special equipment and/or facilities and the employment of several special skills.

The first of the several steps ordinarily employed in the provision or production of an identification card consists in utilizing a pre-printed form or card on which is printed, typed, and written all prescribed pertinent information concerning the person to be identified. This information includes the name and address of the subject person, his signature, and the normal vital statistics, such as date and place of birth, height, weight, color of eyes, and the like.

Very frequently identification cards are required when a person undertakes new employment, and in such case, in addition to the above information, the card will provide full identification of the employer as well as the social security number, date of employment, time clock number, and capacity of the employee who is the subject person.

Such cards are also frequently provided with certain printed rules and laws which must be adhered to by the subject person and by others who have contact with him or come into possession of the card, and also are frequently provided with color and/or number codes to indicate the status of the subject person in respect to the department or section to which he is assigned, his freedom of movement, and the information which he is entitled to receive.

The second step ordinarily taken in the compilation of information for the production of an identification card of the character referred to can be termed the photographic phase. The subject person, after completion of the first step set forth above, is sent to the photographic facility of the company or institution employing his services, where his picture is taken.

In those cases where the company or institution is large, in-plant facilities are generally used to process the negative and positive prints are produced for attachment to the identification cards.

The third step in the production of an ordinary identification card is to obtain the finger prints of the subject person. The finger print is applied directly to that portion of the card specifically designated for this purpose.

Fingerprinting by this process requires the use of printer's ink, or a similar fluid. In addition to being distasteful and messy to use, such fluids produce prints that are readily smudged, or otherwise rendered unreadable, thus making it necessary to fill in a new card, consuming more time and interfering with normal procedure.

The foregoing steps complete the compilation of the information and material required, and then the actual processing of the card takes place. The photograph is cemented on the preprinted and filled-in card, on that portion specifically designated for the purpose. The card is then completely enclosed in plastic by the process of lamination.

The length of time required to produce an identification card in the manner set forth may be from three days to three weeks, depending upon the normal work load of the various departments involved.

An object of my invention is to provide an automatic system adapted to produce a laminated identification card including a photograph of the subject person's face and fingers.

Another object is to provide a novel unitary apparatus for production of identification cards integrating means for photosensitizing the cards, exposing the sensitized cards, developing the exposed cards, and then laminating the developed cards in plastic, in one continuous operation, throughout which the cards are not manually handled.

Another object of this invention is to provide a method and apparatus for the purpose set forth, which is such that it can be readily adapted to employ commercially available photography and plastic laminating processes and equipment.

A further object of the present invention is to provide a method and apparatus for the production of identification cards which is neat and compact, easy and economical to manufacture, and which is such that no special skill is required in its operation.

Another object of my invention is to provide a method and apparatus of the character referred to which is such that a finished plastic laminated identification card having a photograph of the subject person's face and fingers or hands is produced in less than five minutes from the insertion of a filled-in or completed card form.

The various objects and features of my invention will be fully understood from the following detailed description of a typical preferred form and application of the invention, throughout which description reference is made to the accompanying drawings, in which:

FIG. 1 is a perspective view of my new apparatus;

FIG. 2 is a perspective view of a blank card as used in my new apparatus and in carrying out my new method;

FIG. 3 is a perspective view of a photo-laminated identification card such as is produced by my new method and apparatus;

FIG. 4 is a longitudinal sectional view of my new apparatus taken as indicated by line 4—4 on FIG. 1;

FIG. 5 is a sectional view taken substantially as indicated by line 5—5 on FIG. 1;

FIG. 6 is a view similar to a portion of the structure shown in FIG. 4 with parts in different positions;

FIG. 7 is a view similar to a portion of FIG. 6 showing parts in another position;

FIG. 8 is a sectional view taken as indicated by line 8—8 on FIG. 6;

FIG. 9 is a sectional view taken as indicated by line 9—9 on FIG. 6;

FIG. 10 is a perspective view of a portion of my new construction;

FIG. 11 is a sectional view taken as indicated by line 11—11 on FIG. 10;

FIG. 12 is a sectional view taken as indicated by line 12—12 on FIG. 4; and

FIG. 13 is a diagram of the electrical system.

The method and apparatus provided by the present invention is adapted to integrate and automate the processes of producing a laminated identification card with a photograph of the subject person's face and fingers or hands thereon.

In carrying out the invention, a pre-printed card A is employed, on which is recorded the statistical information required. The card is formed of paper or a suitable plastic sheet and has front and rear surfaces on which the required information can be recorded. The front surface 10 of the card has a clear or unmarked portion 11 reserved or set aside for the photograph which is to be applied to the card. When the required information is written or typed on the card A, it is inserted into the apparatus that I provide.

The processes performed by my new apparatus, in the order of their occurrence, are, first, photosensitizing the portion 11 on the front surface 10 of the card A, second, photographing the face and fingers or hands of the subject person, third, developing and fixing the photograph taken in the second step, and, fourth, laminating the card in or with plastic.

The apparatus or machine that I provide for integrating and carrying out the several steps set forth above, includes, an elongate, horizontally disposed, box-like body B having inlet and discharge ends 12 and 13, front and rear sides 14 and 15, a top 16 and a bottom 17.

Arranged within the body are four longitudinally spaced partitions 18, 19, 20 and 21, defining five longitudinally spaced stations and/or compartments, there being a loading station 22 at the inlet end of the body, a photosensitizing compartment 23, a camera compartment 24, a photodeveloping compartment 25, and a laminating compartment 26.

Each of the several partitions is provided with an opening 27, establishing communication between adjacent compartments, through which a suitable card transport means C extends.

The transport means C that I provide includes a first sprocket wheel 30 arranged in the loading station 22 at the inlet end of the body, a second sprocket wheel 31 arranged in the photodeveloping compartment 25, and a conveyor belt 35 engaged about the said sprocket to extend through the openings 27 in the several partitions, and through the compartments 23, 24 and 25. The sprocket wheel 30 is rotatably supported on an axle member 32 suitably mounted in the body to extend transversely thereof, while the sprocket wheel 31 is carried by an output shaft 33 of an electric motor 34, which motor is provided with a suitable reduction gear.

The motor 34 is connected with a power supply line L having a master control switch S therein (see FIG. 13).

The conveyor belt 35 is shown as an endless rubber belt having a flat outer surface 36 and a serrated inner side 36 which engages or meshes with the sprocket wheels.

The belt 35 is provided with a card carrying means D, which means includes a pair of longitudinally spaced outwardly projecting posts 37 and 38 on the outer surface 36 of the belt 35. The forward post 37 has a rearwardly opening longitudinal slot or groove 39 adapted to slidably receive the leading edge of the card A, while the rear post 38 has a forwardly opening longitudinal slot or groove 40 adapted to receive and frictionally engage the rear or trailing edge of the card A, as clearly illustrated in the drawings.

In the particular case illustrated, the post 38 has a forwardly projecting slotted arm 41 at its base, to engage the rear portion of the bottom edge of the card A and to support the card in a predetermined horizontal plane, as the forward post 37 is advanced forwardly and downwardly around the forward sprocket 31 and is disengaged from the card, as clearly illustrated in FIG. 8 of the drawings.

In practice, the forward post may be eliminated without adverse effects.

In addition to the foregoing the belt 35 is further provided with a rearwardly projecting lug or cam 42, which cam is in fixed predetermined relationship with the means D and is adapted to engage and operate certain of the switches provided in the electrical system, as will be hereinafter described.

The loading station 22 at the inlet end of the body B has a flat horizontally disposed top 16' which is offset and spaced below the top 16 of the remainder of the body. The top 16' is positioned so that its top surface occurs in the same horizontal plane as the uppermost portion of the belt 35 and is provided with a longitudinally extending slot opening 45 to freely accommodate the belt. The slot 45 extends outwardly from the slot 27 in the partition 18, with which it communicates, a sufficient distance to freely receive the posts 37 and 38 of the means D as the said posts advance upwardly and forwardly about the sprocket wheel 30.

The slot opening 45 is provided with a suitable light and dust seal 46 which can, in its simplest embodiment, consist of a split flexible membrane 47 extending over the opening and held in fixed position by a suitable frame 48 extending about the perimeter of the opening and fixed to the top 16'.

With the loading station 22 set forth above, it will be apparent that when the posts 37 and 38 of the means D advance around the sprocket 30 and are stopped, as by opening the switches S, so as to project upwardly in parallelism through the seal 46, the card A to be processed can be easily and conveniently engaged therewith.

The partition 18 establishes an end wall for the upper portion of the body B and separates the photosensitizing compartment 23 from the loading station 22. The slot opening 27 in the partition 18 is provided with a light and dust seal 49, which seal is coextensive with the opening 27 and is identical in structure with the seal 46 related to the opening 45, which is described above.

Arranged within the compartment 23 is a microswitch 50, which switch is connected in series with the power supply line L extending to the motor 34 of the transport means C. The switch 50 normally closes the circuit to the motor and is opened by the cam 42 on the belt 35, when the support means D with the card A engaged therein, reaches a predetermined position within the said photosensitizing compartment. When the switch 50 is opened by the cam 42, the transport means stops and a suitable means E for carrying out the photosensitizing process is energized.

The means E that I provide includes a solenoid actuated platen or card support 51 arranged within the compartment 23 to occur at the rear side of the card A, opposite the portion 11 of the card reserved for the photograph of the subject person. The platen normally occurs in spaced relationship from the card so as to allow the card and the means D to move thereby, and, when actuated, shifts forwardly into bearing engagement with the rear side of the card.

The solenoid actuated card support or platen is connected with the switch 50, which switch closes the circuit to the solenoid when the circuit to the motor is open.

The means E that I provide further includes a stamping means G, which means is shown as including a solenoid operated rotary stamping mechanism. The rotary stamping mechanism can vary widely in form, it being similar to one of the many manually operated rotary rubber stamp mechanisms in common use today.

In the case illustrated, the stamping mechanism is shown as including a frame 53 mounted in fixed position in the compartment 23 and having racks 54 related thereto, a carriage 55 shiftably carried by the frame, a stamping head 56 with a rubber pad 57 rotatably supported by the carriage and having pinions fixed thereon and engaged with the racks 54 whereby, when the carriage and head are shifted longitudinally relative to the frame, the head is rotated 180°. The stamping mechanism further includes a solenoid 58 mounted in fixed position on the frame and coupled with the carriage. The frame 53 carries a reservoir 59, which reservoir is provided with a rubber or fabric pad 59' which is maintained saturated with a suitable light-sensitive photographic chemical on which the rubber pad 57 normally rests.

The stamping mechanism is arranged in the compartment 23 at the forward side of the card A and is in axial alignment with the solenoid actuated support 51. The said mechanism is spaced from the card and the means D so as to normally permit the said card and means D to travel thereby, and is such that when the solenoid 58 is energized the pad 57 is shifted rearwardly away from the reservoir 59, rotated 180°, and is urged into pressure engagement with the portion 11 of the card A, thereby depositing the photographic chemical on the card.

The solenoid 58 of the stamping mechanism is in the same circuit as the card support means 51 and is energized simultaneously therewith. The circuit to the solenoid 58 and support 51 is provided with a cut-off relay 49 which breaks the circuit immediately after the solenoids have been fully actuated. Also, in the circuit to the said solenoids and connected with the circuit to the motor 34, is a normally open time delay switch 60 which, when closed, bridges the switch 50, energizing the motor and causing the cam 42 to move past the switch 50, thereby breaking the circuit to the solenoids of the photosensitizing process and closing the motor circuit. The time delay switch is such that it can be adjusted to hold the motor circuit open a sufficient length of time to allow the chemical deposited on the card A to dry.

It is to be understood that a fast drying chemical can be employed and that a suitable sealing means can be provided between the head and the reservoir of the stamping means to prevent light damage to the chemical, as when the light seal 49 is broken when the card and means D are moved therethrough.

The card A, thus being sensitized, and the means C energized, the card is transported into the photography compartment 24, which compartment is defined by the partitions 19 and 20.

Arranged within the compartment 24 is a microswitch 65, which switch is identical with the switch 50, being in series in the circuit to the motor 34 of the transport means and responsive to the cam 42 on the belt.

When the card A in the support means D reaches a predetermined position in the compartment 24, the circuit to the motor 34 is broken and the card is stopped.

Also, within the compartment 24 is a camera 66 including an elongate box 67 arranged to extend transversely of the body with its rear end disposed towards the front face 10 of the card A and its forward end disposed towards the front wall 14 of the body. The rear end of the box is provided with an opening (not shown), corresponding in area and in register with the portion 11 on the card. The front end of the box is provided with a shutter mechanism 68 on which is mounted a forwardly projecting objective lens 69, which lens extends through an opening 70 in the front wall 14 of the body.

The shutter mechanism 68 is connected with a solenoid actuator 71 carried by the body. The solenoid 71 is connected with one pole of a manually operable switch 72 accessible at the top 16 of the body. The other pole of the switch 72 is connected with the normally open side of the micro-switch 65.

Connected with the first mentioned pole of the switch 72 is a line 73 with a normally open time delay switch 74 therein and extending to the power line L, forward of the switch 65.

With the structure set forth above, it will be apparent that when the switch 72 is closed, the solenoid 71 is energized, actuating the shutter 68 and exposing the sensitized portion 11 of the card. It will be further apparent that subsequent to the shutter being actuated the switch 74 closes, bridging the switch 65 and energizing the motor 34 of the means C, thereby causing the cam 42 on the belt 35 to move past the switch 65, again closing the circuit to the motor and causing the said means C to advance the card A into the photodeveloping compartment 25 defined by the partitions 20 and 21, in which the developing process is performed.

The developing process is carried out by the application of a developing reagent on the exposed photosensitized portion 11 of the card. This process is carried out by means identical with the means employed in the sensitizing compartment of the apparatus.

The apparatus within the compartment 25 includes, generally, a micro-switch 80, a solenoid actuated card support 81, and a solenoid actuated rotary stamping mechanism 82. The switch 80 is connected with the power circuit to the motor 34 and with the support 81 and stamping mechanism 82 in the same manner as the switch 50, support 51 and stamping means in the compartment 23. The circuit to the solenoid is provided with a cut-off relay 83 and a bridge line to the motor circuit having a time delay switch 84 therein.

The only distinction between the photo-sensitizing and photo-developing processes is the chemical which is employed.

Since the apparatus in the developing compartment 25 is identical with that in the sensitizing compartment 23 I will not burden this specification with further description thereof.

When the means C is again energized, the means D is advanced around the sprocket wheel 31. As the forward post 37 advances around the sprocket 31 it becomes disengaged from the leading edge of the card A. As the post 38 advances toward the sprocket, the card A is projected horizontally beyond the forwardmost portion of the belt and through the opening 27 in the partition 21 and into the laminating compartment 26, where it is engaged by the laminating mechanism, as will be hereinafter described.

The opening 27 in the partition 21 is provided with a light seal 85 similar to the light seal 45, and through which the card A is urged when being transported from the compartment 25 into the compartment 26.

The laminating means in the compartment 26 includes a pair of laterally spaced vertical columns 86 occurring at the opposite sides of the central axis of the body, a roll 87 of raw plastic ribbon rotatably carried by each column, a pair of laterally spaced vertically disposed primary guide rollers 88 adjacent the partition 21 and occurring at the opposite sides of the opening 27 therein, a pair of laterally spaced vertically secondary guide rollers 89 spaced forward in the direction of travel of the card, from the primary guide rollers 88, a pair of laterally spaced vertically disposed pressure rollers 90 forward of the secondary guide rollers 89, a cut-off means 91 forward of the pressure rollers 90, and a pair of laterally spaced vertically disposed heat rollers 92 spaced forward of the cut-off means 91.

The plastic ribbons R, being raw plastic, have considerable adhesive qualities and are such that when brought into contact with a card and with each other they tend to grip and/or stick. If the ribbons R are established of a plastic which is not possessed with the required adhesive characteristics, a suitable adhesive can be applied to one surface thereof, so that the desired gripping and sticking effect will be obtained.

The raw plastic ribbons R extend laterally inwardly and forwardly from the rolls 87 and are engaged around the rear sides of the primary guide rollers 88 to extend inwardly and forwardly between the secondary guide rollers 89. The secondary guide rollers 89 are in close proximity to each other, so as to maintain the ribbons in spaced relationship a distance slightly less than the thickness of the card A. The rollers 89 are possessed with sufficient resiliency to accommodate the ribbons R and the card A. In practice, the rollers 89 can be provided with a resilient rubber sleeve, or the like, to assure sufficient resiliency to receive the card and ribbons.

The pressure rollers 90 have central axle members projecting from their opposite ends. The axle of one of said rollers 90 is rotatably supported at its opposite ends by bearings 93 carried by a suitable frame 94 mounted within the compartment, so that the surface of said roller is substantially tangential with the central axis of the construction. The ends of the axle of the other roller 90 are rotatably engaged in bearings 95 carried by suitable slides 96 which are slidably carried by the frame 94. A compression spring 97 is engaged between the frame and slide 96 and serves to normally yieldingly urge the roller into pressure bearing engagement with the other or fixed pressure roller.

The axle of the said other or fixed pressure roller 90 is provided with a bevel gear 98 which gear is engaged by a mating bevel gear 99 on the output shaft 100 of a prime mover, such as an electric motor 101 mounted within the compartment 26.

The axles of each of the rollers 90 are further provided with spur gears 102, which gears mesh with each other, causing the said rollers to rotate in synchronism.

With the structure set forth above it will be apparent that the pressure rollers 90 are spring loaded and are power driven, with the result that in addition to pressing the ribbons R into engagement with the card A, they also serve to draw the ribbons R from the rolls, around and between the guide rollers and to advance the said sandwiched ribbons and card forwardly through the cut-off means 91 and into engagement between the heat rollers 92.

The cut-off means 91 is arranged immediately forward of the pressure rollers 90 and is shown as including a rectangular frame 105 mounted in the body on a plane extending transverse of the axis of the body. The frame 105 has a vertical side occurring adjacent the central axis of the construction, which side establishes a platen 106 and is provided with an inwardly opening longitudinal blade-receiving groove. The other vertical side of the frame is spaced from the central axis of the construction and carries a solenoid 107. Within the frame and connected with the solenoid is an elongate, vertically disposed blade 108. The blade normally occurs within the frame in spaced relationship with the platen 106 and is urged into engagement with the platen when the solenoid 107 is energized.

With the means 91 set forth above, it will be apparent that when the ribbons R are advanced through the frame 105 of the means 91 and the solenoid 107 is energized, the portions of the ribbons so advanced are cut off from the portions of the ribbons not yet advanced therethrough.

The heat rollers 92 are arranged immediately forward of the cut-off means 91 in predetermined spaced relationship therewith, and with their adjacent sides occurring in close proximity to and equidistant from the central longitudinal axis of the construction. The rollers 92 are substantially alike, each including a cylindrical metal barrel 110, insulated closures 111 at the opposite ends of the barrel, and an elongate axle 112 extending through the barrel and closures and fixed to the closures. The ends of the axle member 112 are rotatably supported in suitable bearings 113 fixed within the body B.

Within each roller 92 is a resistance heater 114 which is shown as including a sleeve 115 of insulating material supported between the closures in spaced relationship from the barrel and the axle, and a resistance wire 116 wound about the sleeve.

The ends or leads for the heater wire 116 extend through openings in the lowermost closure and connect with suitable contact rings 117 carried by the said closure. A suitable block 118 is provided in the body adjacent the lower ends of the rollers 92, which block carries a plurality of contact brushes 119 which project therefrom. Each brush 119 engages one of the contact rings 117 on the rollers. The fixed ends of the brushes 119 are connected with the power line L and are under control of the master control switch S, as clearly illustrated in the wiring diagram.

With the heaters 114 set forth above, it will be apparent that they are energized immediately upon closing the switch S and remain heated during the entire operation of the apparatus.

The lower portion of the axles 112 of the heat rollers are provided with meshed spur gears 120, one of which is engaged by a drive pinion 121 on the output shaft of an electric motor 122 mounted within the compartment, which serves to drive the rollers in synchronism when energized.

In the preferred carrying out of the invention, the heat rollers are provided with means for cutting and trimming the laminated identification card. The cutting and trimming means provided is shown as including an outwardly projecting cutting rib 123 on the exterior of one of said rollers, and a rib-receiving groove 124 in the exterior of the other of said rollers.

As the rollers are rotated and the card A sandwiched between the ribbons R is advanced therebetween, the ribbons are bonded to the card and are fused with each other about the perimeter of the card, and the rib 123 cuts and/or trims the excess plastic about the card as it enters the groove 124, leaving a uniform border of plastic thereabout.

It will be apparent that if a plastic card A is employed, the ribbons R are fused therewith, as distinguished from merely being bonded thereto.

The end wall 13 of the body B is provided with a discharge opening 125, which opening is in alignment with the central axis of the construction, and through which the finished identification card and the plastic trimmings are advanced by the heat rollers. In the case illustrated, a suitable guide means or chute 125' is related to the opening 125.

The laminating apparatus is supplied with current by a line 130, which line is under control of the master control switch S. The motors 101 and 122 and the solenoid 107 are connected with the line 130 by lines 131, 132 and 133, respectively.

A micro-switch 134 is provided in the line 131. A switch 134 is arranged adjacent the end of one of the pressure rollers 90 and is normally held open by an actuating pin 135 on the roller (see FIG. 9).

A micro-switch 136 and a cut-off relay 137 are provided in the line 132 connected with the solenoid 107. The switch 136 is normally open, is arranged adjacent one of the pressure rollers 90, and is adapted to be closed by a pin 138 on said pressure roller as the said roller is rotated (see FIG. 3).

The pins 135 and 138 are positioned so that the switch 136 is closed just before the switch 134 is opened.

A micro-switch 140 is provided in the line 133. The switch 140 is arranged adjacent one end of one of the heat rollers 92 and is normally held open by an actuating pin 141 on the said roller (see FIG. 6).

The circuit for the laminating apparatus further includes a bridge line 142 extending from the line 130 to the motors 101 and 122, in which is a normally open microswitch 143. The switch 143 is positioned adjacent the secondary guide rollers 89 (see FIG. 8) and is adapted to be closed by the card A as soon as the card is advanced into engagement with the rollers 89. The switch 134, being closed temporarily by the card A, as the said card is advanced through the construction, results in the motors 101 and 122 being energized so that the pins 135 and 141 are shifted out of engagement with the switches 134 and 140, allowing said switches to close. Thus, when the card is disengaged from the switch 143 and the switch 143 is again opened, the switches 134 and 140 are closed and remain closed until the pin 135 opens the switch 134 and the pin 141 subsequently opens switch 140.

With the above set-up it will be apparent that the pressure rollers 90 and the heat rollers 92 are energized simultaneously and make one complete revolution in handling each card that is processed. Since the ribbons R, or plastic material, cannot be left between the heat rollers 92 when the structure is idle, and since it is desired that the finished card and plastic trimmings be completely discharged from the construction, the rollers 92 are considerably larger in diameter than the pressure rollers 90, rotate at the same peripheral speed as the rollers 90, and continue to rotate after the cut-off means has been actuated and the rollers 90 have stopped.

By proper proportioning and positioning of the various components and parts utilized in the laminating process, each card A is accurately and uniformly bonded in plastic and is suitably trimmed, as circumstances require.

The photo-sensitive chemical and the developing and fixing chemicals employed in carrying out the present invention can vary considerably without in any way affecting the present invention. There are several commercially available chemicals which are readily adaptable for use in the instant method and apparatus.

In practice, the apparatus can further include a suitable frame 150 positioned in spaced relationship from the front of the body B, in which the head and hands of the person being photographed are positioned, thus assuring proper focusing of the subject. Still further, the frame 150 can, if desired, be provided with magnifying lenses 151 upon which the person's hands or particular fingers of the hands can be placed, and which serve to magnify the images of the hands and/or fingers, so that the photograph of these images can be easily read.

After the finished identification card is discharged from the body and the means D has advanced to the loading station 22, the master control switch S is opened and the apparatus stands ready to receive and process another card.

Having disclosed only a typical preferred form of apparatus and a typical manner of carrying out the method of my invention, I do not wish to be limited or restricted to the specific details herein set forth, but wish to reserve to myself any variations or modifications that may appear to those skilled in the art and fall within the scope of the following claims.

Having described my invention, I claim:

1. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card, laminating means in the laminating compartment adapted to laminate the card in plastic and control means for the transport means responsive to the position of the card and the operation of the several other means, whereby the transport means is intermittently operated to advance the card through the compartments and into and out of engagement with said other means.

2. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, and control means for the transport means responsive to the position of the card and the operation of the several other means, whereby the transport means is intermittently operated to advance the card through the compartments and into and out of engagement with said other means said means in the sensitizing and developing compartments including solenoid actuated stamping mechanisms under control of switches of the control means responsive to the position of the card in the compartments.

3. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, and control means for the transport means responsive to the position of the card and the operation of the several other means, whereby the transport means is intermittently operated to advance the card through the compartments and into and out of engagement with said other means said means in the sensitizing and developing compartments including solenoid actuated stamping mechanisms under control of switches of the control means responsive to the position of the card in the compartments.

4. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sentitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, and control means for the transport means responsive to the position of the card and the operation of the several other means, whereby the transport means is intermittently operated to advance the card through the compartments and into and out of engagement with said other means said means in the sensitizing and developing compartments including solenoid actuated stamping mechanisms under control of switches of the control means responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means being adapted to project said card between the ribbons at the guide rollers, said ribbons serving to support and transport said card between the pressure and heat rollers.

5. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, and control means for the transport means responsive to the position of the card and the operation of the several other means, whereby the transport means is intermittently operated to advance the card through the compartments and into and out of engagement with said other means said means in the sensitizing and developing compartments including solenoid actuated stamping mechanisms under control of switches of the control means responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means being adapted to project said card between the ribbons at the guide rollers, said ribbons serving to support and transport said card between the pressure and heat rollers, said drive means for the pressure and heat rollers being under control of a switch of the control means, which switch is closed by the card when the card is engaged between the ribbons.

6. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, and control means for the transport means responsive to the position of the card and the operation of the several other means, whereby the transport means is intermittently operated to advance the card through the compartments and into and out of engagement with said other means, said means in the sensitizing and developing compartments including solenoid actuating stamping mechanisms under control of switches of the control means responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means being adapted to project said card between the ribbons at the guide rollers, said ribbons serving to support and transport said card between the pressure and heat rollers, said drive means for the pressure and heat rollers being under control of a switch of the control means, which switch is closed by the card when the card is engaged between the ribbons, and cut-off means in the laminating compartment between the pressure and heat rollers to cut off the portions of the ribbons between which the card is positioned and which is advanced between the heat rollers from the portions of the ribbons engaged about and extending between the guide and pressure rollers, said cut-off means including a platen in fixed position adjacent one side of the ribbons, a blade adjacent the other side of the ribbons and a solenoid coupled with the blade and adapted to urge the blade towards the platen to cut the ribbons, and solenoid being under control of a switch of the control means, which switch is responsive to the rotative position of the pressure rollers.

7. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, and control means for the transport means responsive to the position of the card and the operation of the several other means, whereby the transport means is intermittently operated to advance the card through the compartments and into and out of engagement with said other means said means in the sensitizing and developing compartments including solenoid actuated platens to engage and support the side of the card opposite said reserved portion and solenoid actuating stamping mechanisms to engage the reserved portion of the card and under control of switches of the control means responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means being adapted to project said card between the ribbons at the guide rollers, said ribbons serving to support and transport said card between the pressure and heat rollers, said drive means for the pressure and heat rollers being under control of a switch of the control means, which switch is closed by the card when the card is engaged between the ribbons, and cut-off means in the laminating compartment between the pressure and heat rollers to cut off the portions of the ribbons between which the card is positioned and which is advanced between the heat rollers from the portions of the ribbons engaged about and extending between the guide and pressure rollers, said cut-off means including a platen in fixed position adjacent one side of the ribbons, a blade adjacent the other side of the ribbons and a solenoid coupled with the blades and adapted to urge the blade towards the platen to cut the ribbons, said solenoid being under control of a switch of the control means, which switch is responsive to the rotative position of the pressure rollers, said heat rollers having means to trim the plastic about the card including an outwardly projecting cutting rib on one of said heat rollers and a rib-receiving groove in the other of said rollers.

8. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, said transport means including, a first sprocket wheel at the transport station, a second sprocket wheel in the developing compartment, a motor driving the second wheel, a flexible conveyor belt engaged about said wheels and extending longitudinally of the loading station and through the sensitizing, exposing and developing compartments, and a card holder on the belt to releasably engage the trailing edge of the card and support the card in a predetermined position as it is advanced through the sensitizing, exposing and developing compartments, said holder supporting the card in a horizontal position when the portion of the belt adjacent to the card advances about the second wheel whereby said card projects beyond the second wheel and into the laminating compartment.

9. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, said means in the sensitizing and developing compartments including solenoid actuated stamping mechanisms under control of switches responsive to the position of the card in the compartments, said transport means including, a first sprocket wheel at the loading station, a second sprocket wheel in the developing compartment, a motor driving the second wheel, a flexible conveyor belt engaged about said wheels and extending longitudinally of the loading station and through the sensitizing, exposing and developing compartments, and a card holder on the belt to releasably engage the trailing edge of the card and support the card in a predetermined position as it is advanced through the sensitizing, exposing and developing compartments, said holder supporting the card in a horizontal position when the portion of the belt adjacent to the card advances about the second wheel whereby said card projects beyond the second wheel and into the laminating compartment, and into engagement with the laminating means, before said holder is advanced around said second wheel.

10. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, said means in the sensitizing and developing compartments including solenoid actuated stamping mechanisms under control of switches responsive to the position of the card in the compartments, said transport means including, a first sprocket wheel at the loading station, a second sprocket wheel in the developing compartment, a motor driving the second wheel, a flexible conveyor belt engaged about said wheels and extending longitudinally of the loading station and through the sensitizing, exposing and developing compartments, and a card holder on the belt to releasably engage the trailing edge of the card and support the card in a predetermined position as it is advanced through the sensitizing, exposing and developing compartments, said holder supporting the card in a horizontal position when the portion of the belt adjacent to the card advances about the second wheel whereby said card projects beyond the second wheel and into the laminating compartment, and into engagement with the laminating means, before said holder is advanced around said second wheel.

11. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, said means in the sensitizing and developing compartments including solenoid actuated stamping mechanisms under control of switches responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means being adapted to project said card between the ribbons at the guide rollers, said ribbons serving to support and transport said card between the pressure and heat rollers, said transport means including, a first sprocket wheel at the transport station, a second sprocket wheel in the developing compartment, a motor driving the second wheel, a flexible conveyor belt engaged about said wheels and extending longitudinally of the loading station and through the sensitizing, exposing and developing compartments, and a card holder on the belt to releasably engage the trailing edge of the card and support the card in a predetermined position as it is advanced through the sensitizing, exposing and developing compartments, said holder supporting the card in a horizontal position when the portion of the belt adjacent to the card advances about the second wheel whereby said card projects beyond the second wheel and into the laminating compartment, and into engagement with the laminating means, before said holder is advanced around said second wheel.

12. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, said means in the sensitizing and developing compartments including solenoid actuated stamping mechanisms under control of switches responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means serving to project said card between the ribbons at the guide rollers, said ribbons serving to support and transport said card between the pressure and heat rollers, said drive means for the pressure and heat rollers being under control of a switch, which switch is closed by the card when the card is engaged between the ribbons, said transport means including, a first sprocket wheel at the loading station, a second sprocket wheel in the developing compartment, a motor driving the second wheel, a flexible conveyor belt engaged about said wheels and extending longitudinally of the loading station and through the sensitizing, exposing and developing compartments, and a card holder on the belt to releasably engage the trailing edge of the card and support the card in a predetermined position as it is advanced through the sensitizing, exposing and developing compartments, said holder supporting the card in a horizontal position when the portion of the belt adjacent to the card advances about the second wheel whereby said card projects beyond the second wheel and into the laminating compartment, and into engagement with the laminating means, before said holder is advanced around said second wheel.

13. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, said means in the sensitizing and developing compartments including solenoid actuated stamping mechanisms under control of switches responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means being adapted to project said card between the ribbons at the guide rollers, said ribbons serving to support and transport said card between the pressure and heat rollers, said drive means for the pressure and heat rollers being under control of a switch, which switch is closed by the card when the card is engaged between the ribbons, and cut-off means in the laminating compartment between the pressure and heat rollers to cut off the portions of the ribbons between which the card is positioned and which is advanced between the heat rollers from the portions of the ribbons engaged about and extending between the guide and pressure rollers, said cut-off means including a platen in fixed position adjacent one side of the ribbons, a blade adjacent the other side of the ribbons and a solenoid coupled with the blade and adapted to urge the blade towards the platen to cut the ribbons, said solenoid being under control of a switch, which switch is responsive to the rotative position of the pressure rollers, said transport means including, a first sprocket wheel at the transport station, a second sprocket wheel in the developing compartment, a motor driving the second wheel, a flexible conveyor belt engaged about said wheels and extending longitudinally of the loading station and through the sensitizing, exposing and developing compartments, and a card holder on the belt to releasably engage the trailing edge of the card and support the card in a predetermined position as it is advanced through the sensitizing, exposing and developing compartments, said holder supporting the card in a horizontal position when the portion of the belt adjacent to the card advances about the second wheel whereby said card projects beyond the second wheel and into the laminating compartment, and into engagement with the laminating means, before said holder is advanced around said second wheel.

14. An apparatus for producing a laminated in plastic identification card with photographic images of a subject person's face and hands thereon including, an elongate box-like body having a loading station at one end, a light-proof photographic sensitizing compartment adjacent to and communicating with the loading station, a light-proof camera compartment adjacent to and communicating with the sensitizing compartment, a light-proof photographic developing compartment adjacent to and communicating with the camera compartment and a laminating compartment adjacent to and communicating with the developing compartment, transport means extending longitudinally of the body and adapted to receive a form card, having a portion reserved for the photographic images, at the loading station and transport said card through said compartments, means in the photographic sensitizing compartment adapted to apply a light-sensitive photographic chemical on said area of the card, camera means in the camera compartment operable to expose said area of the card, means in the developing compartment adapted to deposit a developing reagent on the area of the card and laminating means in the laminating compartment adapted to laminate the card in plastic, said means in the sensitizing and developing compartments including solenoid actuated stamping mechanisms under control of switches responsive to the position of the card in the compartments, said laminating means including, a pair of guide rollers, a pair of pressure rollers, a pair of heat rollers, a pair of elongate plastic ribbons engaged about said guide rollers and extending between the pairs of pressure and heat rollers and drive means for the pressure and heat rollers, said transport means being adapted to project said card between the ribbons at the guide rollers, said ribbons serving to support and transport said card between the pressure and heat rollers, said drive means for the pressure and heat rollers being under control of a switch, which switch is closed by the card when the card is engaged between the ribbons, and cut-off means in the laminating compartment between the pressure and heat rollers to cut off the portions of the ribbons between which the card is positioned and which is advanced between the heat rollers from the portions of the ribbons engaged about and extending between the guide and pressure rollers, said cut-off means including a platen in fixed position adjacent one side of the ribbons, a blade adjacent the other side of the ribbons and a solenoid coupled with the blade and adapted to urge the blade towards the platen to cut the ribbons, said solenoid being under control of a switch, which switch is responsive to the rotative position of the pressure rollers, said heat rollers having means to trim the plastic about the card including an outwardly projecting cutting rib on one of said heat rollers and a rib-receiving groove in the other of said rollers, said transport means including a first sprocket wheel at the loading station, a second sprocket wheel in the developing compartment, a motor driving the second wheel, a flexible conveyor belt engaged about said wheels and extending longitudinally of the loading station and through the sensitizing, exposing and developing compartments, and a card holder on the belt to releasably engage the trailing edge of the card and support the card in predetermined position as it is advanced through the sensitizing, exposing and developing compartments, said holder supporting the card in a horizontal position when the portion of the belt adjacent to the card advances about the second wheel whereby said card projects beyond the second wheel and into the laminating compartment, and into engagement with the laminating means, before said holder is advanced around said second wheel.

References Cited in the file of this patent

UNITED STATES PATENTS

| 16,637 | Bolles | Feb. 17, 1857 |
|---|---|---|
| 33,230 | Anthoni | Sept. 10, 1861 |
| 1,177,539 | Roth | Mar. 28, 1916 |
| 2,017,200 | Beck | Oct. 15, 1935 |
| 2,171,259 | Scott | Aug. 29, 1939 |
| 2,772,717 | Ware | Dec. 4, 1956 |